United States Patent
Juarez

(10) Patent No.: US 8,925,842 B2
(45) Date of Patent: Jan. 6, 2015

(54) GRATING DEVICE FOR GRATING MATERIALS AND RELATED METHODS

(71) Applicant: Brandon Juarez, Eagle, ID (US)

(72) Inventor: Brandon Juarez, Eagle, ID (US)

( * ) Notice: Subject to any disclaimer, the term of this patent is extended or adjusted under 35 U.S.C. 154(b) by 31 days.

(21) Appl. No.: 13/755,673

(22) Filed: Jan. 31, 2013

(65) Prior Publication Data

US 2014/0209720 A1    Jul. 31, 2014

(51) Int. Cl.
  *A47J 17/00* (2006.01)
  *B02C 17/02* (2006.01)
  *A47J 43/25* (2006.01)

(52) U.S. Cl.
  CPC .................. *A47J 43/25* (2013.01)
  USPC ................ 241/95; 241/168; 241/273.1

(58) Field of Classification Search
  USPC .............. 241/95, 168, 273.1, 273.2; D7/673; 407/29.15
  See application file for complete search history.

(56) References Cited

U.S. PATENT DOCUMENTS

| | | | |
|---|---|---|---|
| 564,595 A | 7/1896 | Cunningham | |
| 564,656 A | 7/1896 | Sobey | |
| 857,336 A | 6/1907 | Fallon, Jr. | |
| 1,016,338 A * | 2/1912 | Lannoye | 241/273.1 |
| 2,087,101 A | 7/1937 | Cerracchio | |
| 2,272,008 A * | 2/1942 | Kehle | 451/356 |
| D152,677 S | 2/1949 | Vault | |
| D167,270 S | 7/1952 | Marcus | |
| 2,615,486 A | 10/1952 | Marcus | |
| 2,714,908 A | 8/1955 | Carmack | |
| 2,720,234 A | 10/1955 | Fett | |
| 2,772,471 A * | 12/1956 | Leng | 407/29.11 |
| 3,583,107 A * | 6/1971 | Benis et al. | 451/514 |
| 3,583,455 A | 6/1971 | Ostrowsky | |
| 3,589,421 A | 6/1971 | Locker | |
| 3,825,049 A | 7/1974 | Swett et al. | |
| 4,037,793 A | 7/1977 | Puustinen | |
| 4,038,892 A * | 8/1977 | Popeil | 83/874 |
| 4,082,230 A | 4/1978 | Bounds | |
| D251,103 S | 2/1979 | Puustinen | |
| 4,212,431 A | 7/1980 | Doyel | |
| 4,546,928 A | 10/1985 | Suzuki | |
| 4,587,734 A | 5/1986 | Jonsson et al. | |
| 4,805,843 A | 2/1989 | Draper | |
| 4,928,893 A | 5/1990 | Prindle | |

(Continued)

OTHER PUBLICATIONS

BlissHome Nigella Lawson's Living Kitchen Parmesan Grater, Beech; product description from the internet at http://www.amazon.com/BlissHome-Nigella-Lawsons-Kitchen-Parmesan/dp/B000BOK56E, accessed on Feb. 2, 2012.

(Continued)

*Primary Examiner* — Faye Francis
(74) *Attorney, Agent, or Firm* — TraskBritt

(57) ABSTRACT

A grating device for grating material includes a hollow handle having an interior cavity and a grater removably attachable to the hollow handle in a first configuration and a second configuration. The handle includes a top wall portion having a major outer surface configured to abut against a palm of a hand of a person gripping the grating device, a pair of elongated longitudinal sidewall portions, a closed end wall portion, and an open end wall portion on an opposing side of the hollow handle from the closed end wall portion. The open end wall portion of the hollow handle includes at least one surface extending through the hollow handle defining a passageway between the interior cavity of the hollow handle and an exterior of the hollow handle. Such a grating device may be used to grate material.

20 Claims, 5 Drawing Sheets

(56) References Cited

U.S. PATENT DOCUMENTS

| | | |
|---|---|---|
| 5,071,663 A | 12/1991 | Dugan |
| 5,083,734 A | 1/1992 | Ancona et al. |
| D329,783 S | 9/1992 | Ancona et al. |
| D330,316 S | 10/1992 | So |
| D331,687 S | 12/1992 | Pujol Gilbert |
| D337,706 S * | 7/1993 | Shun ............................. D7/678 |
| 5,312,054 A | 5/1994 | Feer et al. |
| D347,978 S | 6/1994 | Ritota |
| 5,364,037 A | 11/1994 | Bigelow |
| D354,886 S * | 1/1995 | Diefenbach ................... D7/678 |
| 5,379,954 A | 1/1995 | Funke |
| D362,598 S | 9/1995 | Kibbe |
| D386,648 S | 11/1997 | Kibbe |
| 5,702,061 A | 12/1997 | Kennedy et al. |
| 5,711,491 A | 1/1998 | Molo |
| D393,986 S | 5/1998 | Joergensen |
| 5,803,378 A | 9/1998 | Wolters |
| D415,336 S | 10/1999 | Feix |
| D440,129 S | 4/2001 | Young |
| D442,034 S | 5/2001 | Tardif et al. |
| D447,022 S | 8/2001 | Wong |
| D447,391 S | 9/2001 | Bodum |
| 6,315,224 B1 | 11/2001 | Holcomb et al. |
| 6,412,717 B1 | 7/2002 | Menelaou |
| 6,520,436 B1 | 2/2003 | Herren |
| D478,254 S | 8/2003 | Chau |
| D494,026 S | 8/2004 | Brousseau et al. |
| D498,395 S | 11/2004 | Sowden et al. |
| 6,860,441 B2 | 3/2005 | Richardson |
| 6,957,934 B2 * | 10/2005 | Masterson et al. ......... 407/29.15 |
| D519,001 S | 4/2006 | So |
| 7,178,687 B1 | 2/2007 | Manderfield, Jr. et al. |
| 7,318,558 B2 | 1/2008 | Canegallo |
| 7,331,538 B2 * | 2/2008 | Menze ......................... 241/37.5 |
| D578,838 S | 10/2008 | Hood |
| 7,461,803 B2 | 12/2008 | Boerner |
| 7,469,848 B2 | 12/2008 | Yamanaka et al. |
| D603,663 S | 11/2009 | Bodum |
| 7,611,084 B2 | 11/2009 | Bisio |
| 7,635,101 B1 | 12/2009 | Mah et al. |
| 7,648,088 B2 | 1/2010 | Eikelenberg et al. |
| 7,648,092 B2 | 1/2010 | Wong et al. |
| 7,806,352 B1 | 10/2010 | Reimann et al. |
| 7,819,350 B2 | 10/2010 | Greiner |
| D629,650 S | 12/2010 | Funka, Jr. et al. |
| D642,876 S | 8/2011 | Tetreault |
| D648,990 S | 11/2011 | Chan |
| 2004/0200366 A1 * | 10/2004 | Koerselman et al. ........... 99/537 |
| 2004/0217219 A1 | 11/2004 | Bitonto et al. |
| 2006/0075872 A1 * | 4/2006 | Wangler ......................... 83/856 |
| 2006/0157599 A1 | 7/2006 | Klotz et al. |
| 2006/0231652 A1 * | 10/2006 | Menze ............................ 241/95 |

OTHER PUBLICATIONS

CPI Group, Inc.'s Bodum Parma Stainless Steel Cheese Grater; product description from the internet at http://cpi-group-inc.amazonwebstore.com/Bodum-Parma-Stainless-Steel-Cheese-Grater/M/ . . . , accessed on Feb. 2, 2012.

Jokari 229501 Cheese Grater; product description from the internet at http://www.riverroadshop.com/Jokari-229501-Cheese-Grater/M/B00363B99G.htm, accessed on Feb. 2, 2012.

Microplane Grate-N-Shake (34001); product description from the internet at http://www.google.com/products/catalog?q=food+grater&hl=en&safe=high&qscrl=1&nord . . . , accessed on Feb. 2, 2012.

Chef'n Lime Palm Held Zester With Stainless Steel Blades; product description from the internet at http://homevillage.us/chpazepaheci.html, accessed on Feb. 2, 2012.

Progressive Cheese Grater Set, Item No. 078915033475; product description from the internet at http://www.organizeit.com/progressive-cheese-grater-set.asp?cmpid=gbase, accessed on Feb. 2, 2012.

Progressive S4 Hand Cheese Grater Measure Container; product description from the internet at http://www.mykitchco.com/Progressive-S4-Hand-Cheese-Grater-Measure/M/B004S67UM8 . . . , accessed on Feb. 2, 2012.

RSVP Mini Stainless Steel Cheese Grater with Cushioned Edge; product description from the internet at http://www.google.com/products/catalog?q=cheese+grater&hl=en&safe=high&qscrl=1&no . . . , accessed on Feb. 2, 2012.

\* cited by examiner

US 8,925,842 B2

GRATING DEVICE FOR GRATING MATERIALS AND RELATED METHODS

TECHNICAL FIELD

The present disclosure relates generally to hand-held grating devices for grating material such as food, and to methods making and using such grating devices.

BACKGROUND

Grating devices are devices that are used to disintegrate a larger volume of material into smaller pieces of material. As used herein the term "grating device" means and includes, without limitation, a device used to remove relatively smaller pieces of material from a relatively larger body of the material. For example, cheese grating devices are devices used to generate relatively smaller pieces (e.g., shreds) of cheese from a relatively larger volume of cheese. Various grating devices are known in the art. For example, grating devices are disclosed in U.S. Pat. No. 6,315,224 issued Nov. 13, 2001 to Holcomb et al., U.S. Pat. No. 6,412,717 issued Jul. 2, 2002 to Menalaou, U.S. Pat. No. 7,461,803 issued Dec. 9, 2008 to Boerner, U.S. Patent Application Publication No. 2004/0217219 published Nov. 4, 2004 in the name of Bitonto et al., and U.S. Pat. No. 7,806,352 issued Oct. 5, 2010 to Reimann et al.

BRIEF SUMMARY

Figure 1:
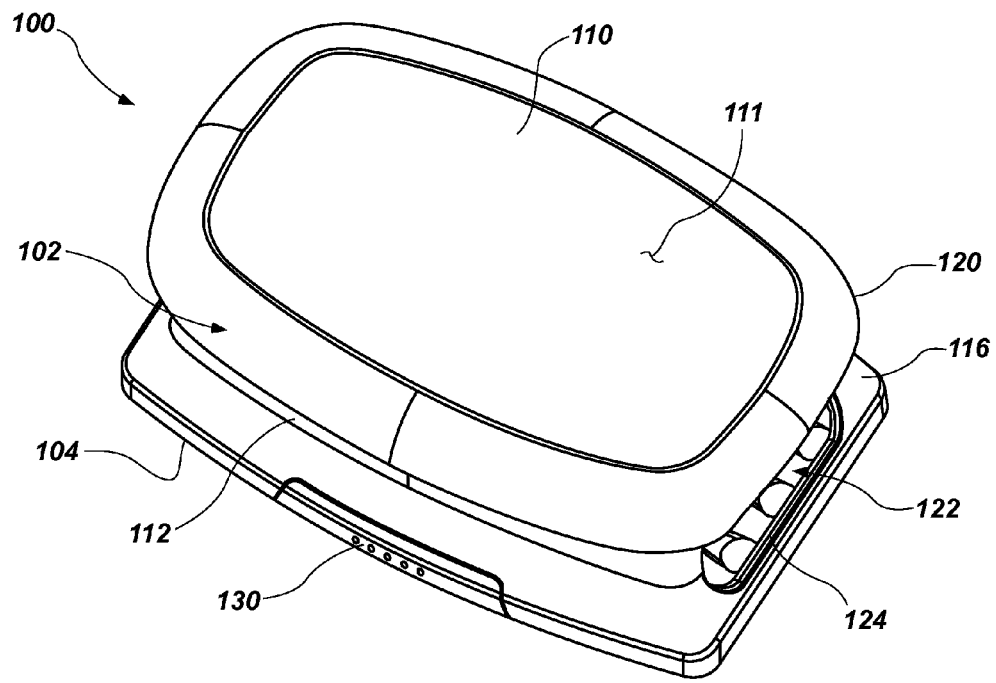
FIG. 1 is a top perspective view of an embodiment of a grating device of the present disclosure.

In some embodiments, the present disclosure includes grating devices that have a hollow handle including an interior cavity and a grater removably attachable to the hollow handle. The hollow handle includes a top wall portion having a major outer surface configured to abut against a palm of a hand of a person gripping the grating device, a pair of elongated longitudinal sidewall portions, a closed end wall portion extending between first longitudinal ends of the pair of longitudinal sidewall portions, and an open end wall portion extending between second longitudinal ends of the pair of longitudinal sidewall portions on an opposing side of the hollow handle from the closed end wall portion, the open end wall portion including at least one surface extending through the hollow handle defining a passageway between the interior cavity of the hollow handle and an exterior of the hollow handle. The grater may be at least substantially planar and may be disposed proximate the major outer surface of the top wall portion of the hollow handle and oriented generally parallel thereto.

In additional embodiments, the present disclosure includes grating devices that have a hollow handle including an interior cavity and a grater removably attachable to the hollow handle. The hollow handle has an interior cavity, and includes a top wall portion having a major outer surface configured to abut against a palm of a hand of a person gripping the grating device, a pair of elongated longitudinal sidewall portions, a closed end wall portion extending between first longitudinal ends of the pair of longitudinal sidewall portions, and an open end wall portion extending between second longitudinal ends of the pair of longitudinal sidewall portions on an opposing side of the hollow handle from the closed end wall portion. The open end wall portion includes at least one surface extending through the hollow handle defining a passageway between the interior cavity of the hollow handle and an exterior of the hollow handle. A grating direction of the device extends from the closed end wall portion to the open end wall portion of the hollow handle when the grater is attached to the hollow handle in the first configuration, and the grating direction of the device extends from the open end wall portion to the closed end wall portion of the hollow handle when the grater is attached to the hollow handle in the second configuration.

In yet further embodiments, the present disclosure includes methods of grating material using grating devices as disclosed herein. As a non-limiting example, in some embodiments, a grater may be attached to a hollow handle in a first configuration to form a grating device. The hollow handle may have an interior cavity and may include a top wall portion having a major outer surface configured to abut against a palm of a hand of a person gripping the grating device, a pair of elongated longitudinal sidewall portions, a closed end wall portion extending between first longitudinal ends of the pair of longitudinal sidewall portions, and an open end wall portion extending between second longitudinal ends of the pair of longitudinal sidewall portions on an opposing side of the hollow handle from the closed end wall portion. The open end wall portion may include at least one surface extending through the hollow handle defining a passageway between the interior cavity of the hollow handle and an exterior of the hollow handle. After attaching the grater to the hollow handle in the first configuration, a body of material may be grated using the grating device by moving the body of material across a grating surface of the grater in a first grating direction extending from the closed end wall portion to the open end wall portion of the hollow handle, and grated material may be allowed to fall out from the interior of the hollow handle through the passageway while grating the body of material. The grater then may be removed from the hollow handle and reattached to the hollow handle in a different, second configuration. A body of material then may be grated using the grating device by moving the body of material across the grating surface of the grater in a second grating direction extending from the open end wall portion to the closed end wall portion of the hollow handle, and grated material may be collected within the interior cavity of the hollow handle while grating the body of material.

DETAILED DESCRIPTION

In the following description, reference is made to the accompanying drawings, which illustrate examples of embodiments of the present disclosure. Other embodiments may be utilized and changes may be made without departing from the scope of the disclosure. Additionally, elements common between figures may retain the same numerical designation.

Figure 2:
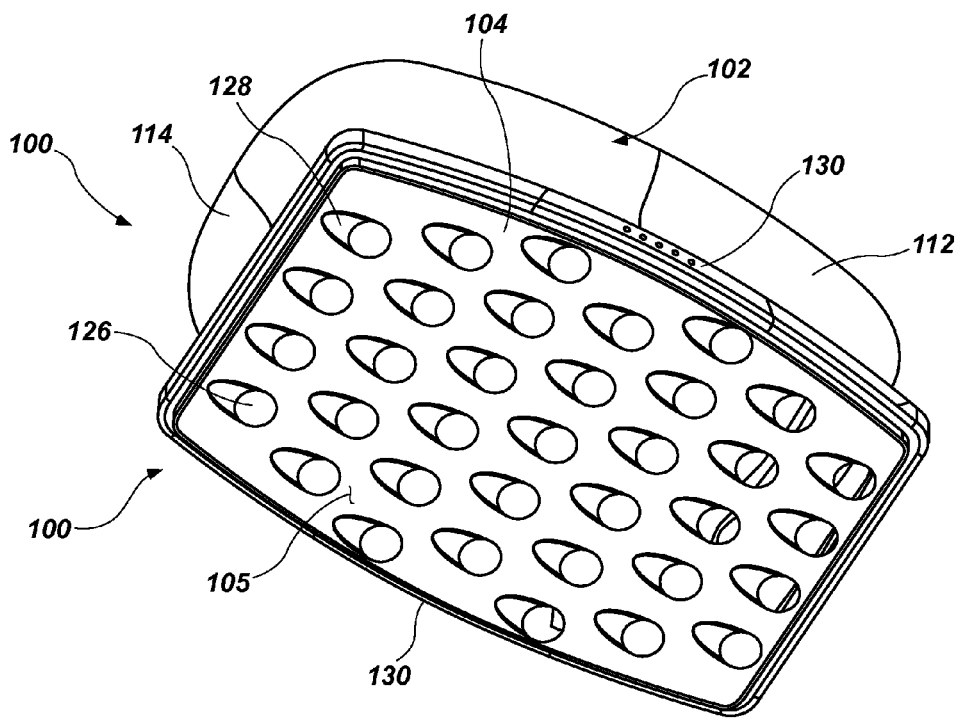
FIG. 2 is a bottom perspective view of the grating device of FIG. 1.

FIGS. 1 and 2 illustrate an embodiment of a grating device 100 of the present disclosure. The grating device 100 includes a hollow handle 102 and a grater 104 removably attached to the hollow handle 102. In other words, the grater 104 may be repeatedly attached to, and removed from, the hollow handle 102 in a relatively easy manner (without causing damage to the hollow handle 102 or the grater 104).

The grating device 100 may be a food grating device used for grating food, such as cheese, vegetables, etc. The grating device 100 is a manual grating device, and may not include any moving parts for grating food or other material. To use the grating device 100, the grating device 100 may be held in the hand of a person, and a body of food or other material to be grated may be held in the other hand of the person using the grating device 100. The person then may provide relative movement between the grating device 100 and the body of food or other material so as to cause the body of food or other material to move across a grating surface 105 of the grater 104.

Figure 4:
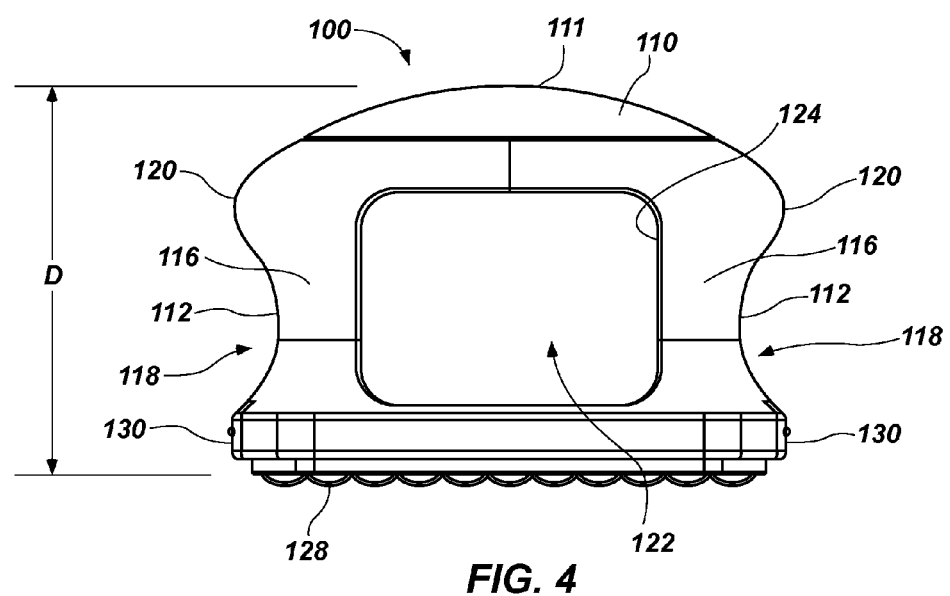
FIG. 4 is a plan view of a first end of the grating device of FIG. 1, which end includes an opening into an interior space within the grating device.

The hollow handle 102 may include a top wall portion 110, a pair of elongated longitudinal sidewall portions 112, a closed end wall portion 114, and an open end wall portion 116 (FIG. 4).

Figure 5:
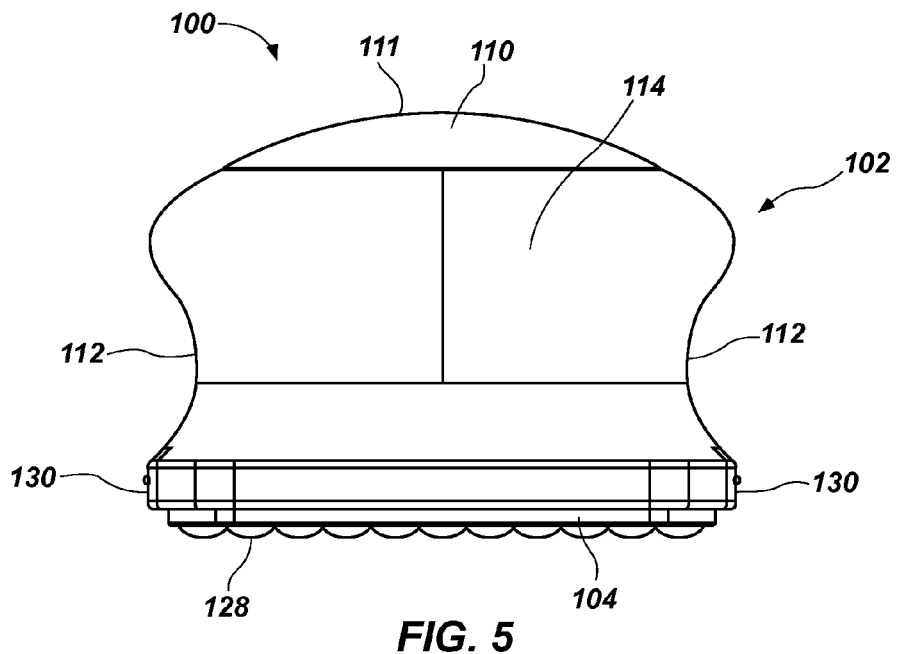
FIG. 5 is a plan view of a closed second end of the grating device of FIG. 1.

As shown in FIG. 1, the top wall portion 110 of the hollow handle 102 may have a major outer surface 111 configured to abut against a palm of a hand of a person gripping the grating device 100 during use of the grating device 100. As shown in FIG. 5, the closed end wall portion 114 extends between the pair of longitudinal sidewall portions 112 at first longitudinal ends of the longitudinal sidewall portions 112. Similarly, the open end wall portion 116 extends between the pair of longitudinal sidewall portions 112 at second longitudinal ends of the longitudinal sidewall portions 112 on an opposing side of the hollow handle 102 from the closed end wall portion 114, as shown in FIG. 4.

The grater 104 may be at least substantially planar in some embodiments. Although the major outer surface 111 of the top wall portion 110 may have a curved contour, the grater 104 may be oriented generally parallel to the major outer surface 111 of the top wall portion 110 of the hollow handle 102. In this configuration, the grating surface 105 of the grater 104 may be oriented generally parallel to the palm of the hand of a user gripping the hollow handle 102 during use of the grating device 100. Orienting the grating surface 105 of the grater 104 generally parallel to the palm of the hand of a user may allow for a relatively high level of control of the grating device 100 compared to previously known grating devices, and, consequently, may decrease the occurrence of uncontrolled slippage between the grating device 100 and the material being grated, which can result in injury to the user.

Figure 3:
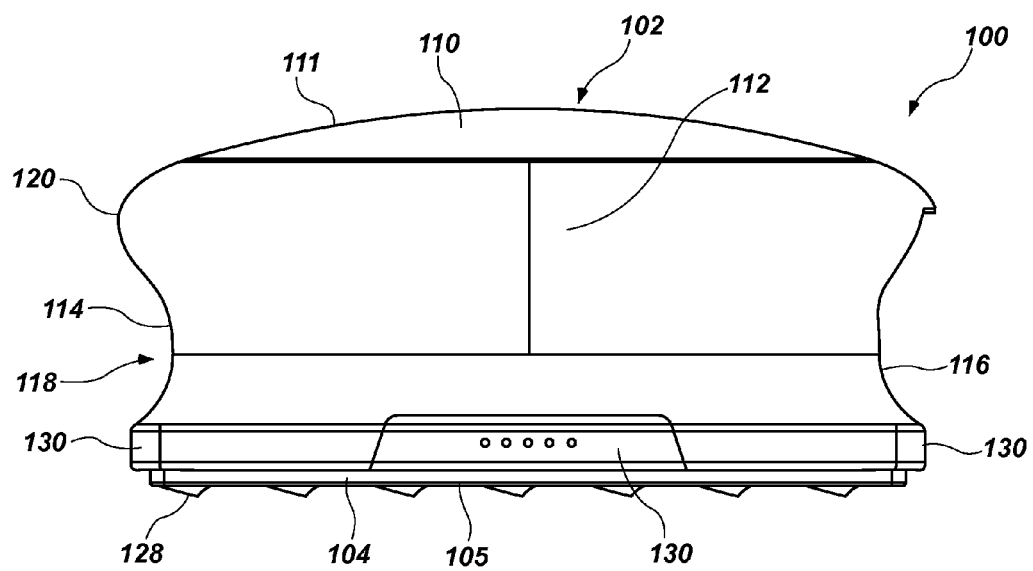
FIG. 3 is a plan view of a side of the grating device of FIG. 1.

Referring to FIGS. 3 through 5, the hollow handle 102 may have an ergonomic configuration, and may include a recess 118 extending into each of the closed end wall portion 114 and the elongated longitudinal sidewall portions 112 of the hollow handle 102. The recess 118 may define a rim 120 extending around the hollow handle 102 along a peripheral edge of the major outer surface 111 of the top wall portion 110 of the hollow handle 102. The rim 120 and the recess 118 may be located and configured to facilitate grasping of the hollow handle 102 by a person gripping the grating device 100 during use thereof. Outer surfaces of the handle 102 may transition in a relatively smooth and continuous manner between the top wall portion 110, the longitudinal sidewall portions 112, the closed end wall portion 114, and the open end wall portion 116 without any significant steps or discontinuities therebetween. In this configuration, the surfaces of the hollow handle 102 in contact with the hand of a user may feel smooth to the user.

The grater 104 may be disposed proximate the major outer surface 111 of the hollow handle 102 when the grater 104 is attached to the hollow handle 102. For example, referring to FIG. 4, a maximum distance D between the major outer surface 111 of the top wall portion 110 of the hollow handle 102 and the grater 104 may be within a range extending from about one half of an inch (0.5 in.) to about four inches (4.0 in.). More particularly, the maximum distance D may be within a range extending from about two inches (2.0 in.) to about three and one-half inches (3.5 in.).

Referring to FIG. 4, the hollow handle 102 includes an interior cavity 122 enclosed within the handle 102 by the top wall portion 110, the longitudinal sidewall portions 112, the closed end wall portion 114 (FIG. 2), the open end wall portion 116, and the grater 104 (FIG. 5). The open end wall portion 116 of the hollow handle 102 (FIG. 1) may include at least one surface 124 extending through the hollow handle 102 and defining a passageway between the interior cavity 122 and the exterior of the hollow handle 102.

As shown in FIG. 5, the closed end wall portion 114 does not include any such passageway extending through the closed end wall portion 114 to the interior cavity 122 within the handle 102.

Figure 6:
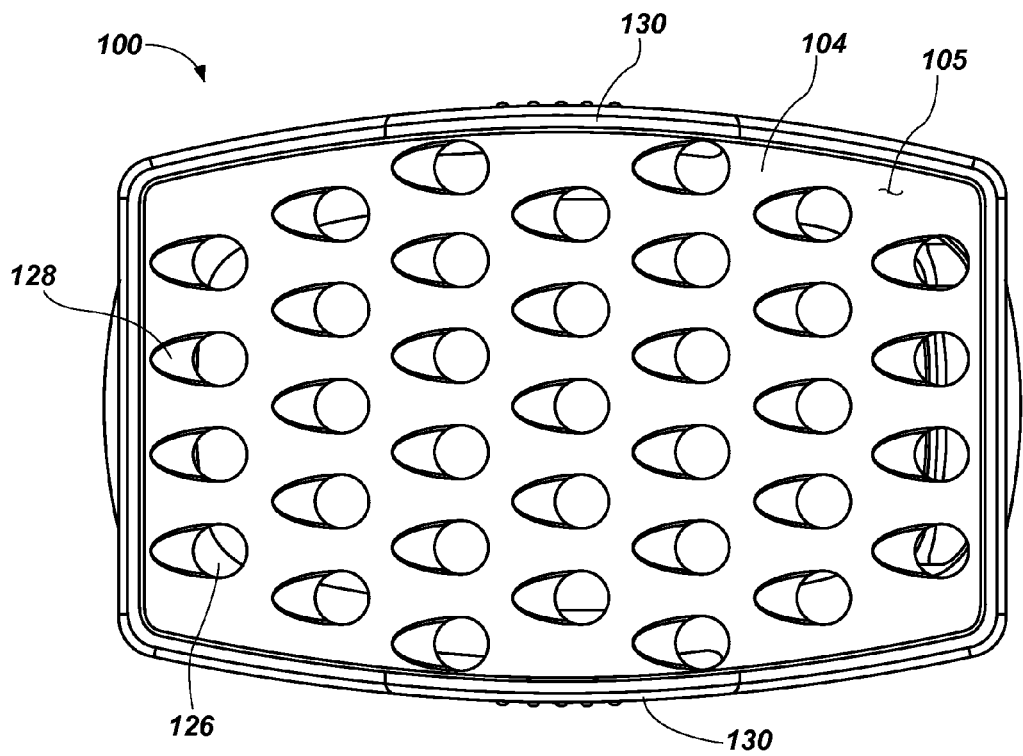
FIG. 6 is a plan view of a bottom grating surface of the grating device of FIG. 1.

Referring to FIG. 6, the grater 104 may include a plurality of apertures 126 and associated protrusions 128. The apertures 126 extend through the grater 104 between the exterior of the grating device 100 and the interior cavity 122 within the hollow handle 102. Each protrusion 128 is located proximate a corresponding aperture 126. The protrusions 128 project outwardly from the grating surface 105 of the grater 104, and are configured to cut food or other material as the food or other material is abutted against the grating surface 105 and slid along the grating surface 105 in a grating direction. The protrusions 128 are further configured to guide pieces of food or other material cut by the protrusions 128 through the associated apertures 126 and into the interior cavity 122 within the hollow handle 102. In other embodiments, the protrusions and apertures may have other configurations, and the grater 104 may include any number (one or more) of associated apertures 126 and protrusions 128.

The grater 104 is removably attachable to the hollow handle 102 in a first configuration and a second configuration. The grating direction of the grating device 100 is the direction along which relative movement is provided between the grater 104 and the food or other material being grated that results in pieces of the food or other material being cut by the protrusions 128 and guided through the apertures 126.

Referring to FIG. 3, the grating direction of the grating device 100 extends from the closed end wall portion 114 to the open end wall portion 116 of the hollow handle 102 (i.e., the left-to-right direction from the perspective of FIG. 3) when the grater 104 is attached to the hollow handle 102 in a first configuration, and the grating direction of the grating device 100 extends from the open end wall portion 116 to the closed end wall portion 114 (i.e., the right-to-left direction from the perspective of FIG. 3) when the grater 104 is attached to the hollow handle 102 in a first configuration. The grater 104 is shown in the figures in the second such configuration. In the first configuration, the orientation of the grater 104 would be rotated one hundred and eighty degrees relative to the handle 102 and the orientation shown in the figures.

The grating device 100 may include one or more connection features located and configured to attach the grater 104 to the hollow handle 102. For example, the grater 104 may include one of a protrusion or a recess, and the hollow handle 102 may include a complementary interfacing protrusion or recess configured to mate with the protrusion or recess of the grater 104 such that mechanical interference between the complementary interfacing features of the grater 104 and the hollow handle 102. In some embodiments, the one or more connection features of the grating device may include a mechanism that may be actuated by a person using the grating device to release the grater 104 from attachment to the hollow handle 102 and to enable the person using the grating device 100 to remove the grater 104 from the hollow handle 102. As a non-limiting example, the grating device 100 may include a button 130 (see, e.g., FIG. 1) on each of the longitudinal sidewall portions 112 of the hollow handle 102, depression of which by a user will release the grater 104 and allow the grater 104 to be removed from the hollow handle 102.

In some embodiments, the one or more connection features used to attach the grater 104 to the hollow handle 102 may allow the grater 104 to be removed from the handle 102 by providing relative movement between the grater 104 and the hollow handle 102 in a direction perpendicular to the grating directions of the grating device 100 (i.e., in a direction perpendicular to the left and right directions from the perspective of FIG. 3). For example, in some embodiments, the one or more connection features used to attach the grater 104 to the hollow handle 102 may allow the grater 104 to be removed from the handle 102 by providing relative movement between the grater 104 and the hollow handle 102 in a direction perpendicular to the grating surface 105 of the grater 104 (i.e., the vertical direction in the perspective of FIG. 3). In other embodiments, the one or more connection features used to attach the grater 104 to the hollow handle 102 may allow the grater 104 to be removed from the handle 102 by providing relative movement between the grater 104 and the hollow handle 102 in a lateral direction parallel to the grating surface 105 of the grater 104, but perpendicular to the grating directions (i.e., the directions extending into and out from the plane of FIG. 3).

In additional embodiments, the present invention includes methods of grating materials using grating devices 100 as described herein. By employing a grating device 100 having a closed end wall portion 114 and an open end wall portion 116, and a grater 104 that may be attached to the hollow handle 102 such that the grating direction extends either from the closed end wall portion 114 to the open end wall portion 116 or from the open end wall portion 116 to the closed end wall portion 114, the grating device 100 may be used either in an orientation that allows grated food or other material to fall out from the hollow handle 102 through the aperture extending through the open end wall portion 116 during the grating action, or in an orientation that allows grated food or other material to be collected within the interior cavity 122 within the hollow handle 102 during the grating action.

Thus, the grater 104 may be attached to the hollow handle 102 in the first configuration as described herein, in which the grating direction extends from the closed end wall portion 114 to the open end wall portion 116 of the hollow handle 102 (i.e., the left-to-right direction from the perspective of FIG. 3). With the grater 104 in the first configuration, a body of food or other material may be grated using the grating device 100 by moving the body of food or other material across the grating surface 105 of the grater 104 in the grating direction while orienting the grating device 100 (relative to the gravitational field) so as to allow grated food or other material to fall (due to gravity) out from the interior cavity 122 within the hollow handle 102 through the passageway extending through the open end wall portion 116 while grating the body of food or other material.

The grater 104 then may be removed from the hollow handle 102 and reattached to the hollow handle 102 in the second configuration as described herein, in which the grating direction extends from the open end wall portion 116 of the hollow handle 102 to the closed end wall portion 114 (i.e., the right-to-left direction from the perspective of FIG. 3). With the grater 104 in the second configuration, a body of food or other material may be grated using the grating device 100 by moving the body of food or other material across the grating surface 105 of the grater 104 in the grating direction while orienting the grating device 100 (relative to the gravitational field) so as to collect grated food or other material within the interior cavity 122 of the hollow handle 102 while grating the body of food or other material. The grated food or other material collected within the interior cavity 122 within the hollow handle 102 of the grating device 100 may be dumped out from the grating device 100 at a later time when desired.

Figure 7:
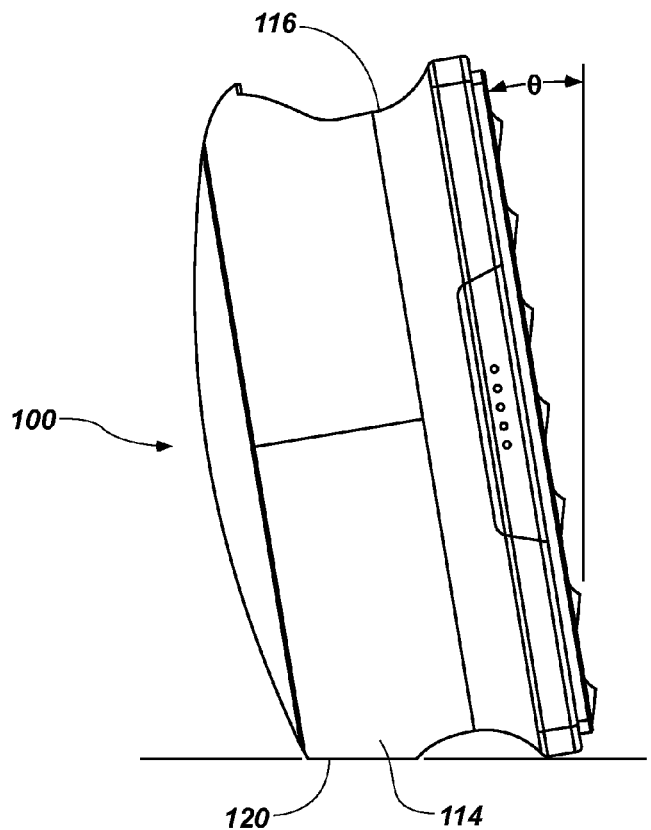
FIG. 7 is an enlarged partial perspective view of an embodiment of a grater of the present disclosure.

Referring to FIG. 7, grating device 100 may be oriented to stand up on either the closed end wall portion 114 or the open end wall portion 116 upon a substantially level surface such as a countertop. Orienting the grating device 100 to stand up on a substantially level surface may allow for a relatively high level of stability and may require a lesser amount of strength to control the grating device 100 while grating. In other configurations, a portion of the rim 120 of the closed end wall portion 114 may be removed to allow the grating device 100 to tilt while standing on the closed end wall portion 114. In this configuration, the grating device 100 may tilt at an angle of $\Theta$ relative to a line perpendicular to the substantially level surface, as depicted in FIG. 7. The angle $\Theta$ may be within a range extending from about zero degrees to about fifteen degrees, which may be controlled by the amount of material removed from the rim 120. For example, the grating device 100 may be oriented to stand up on the closed end wall portion 114 with an amount of the rim 120 removed to allow the grating device 100 to tilt at an angle of five degrees relative to a line perpendicular to the substantially level surface. Tilting the grating device 100 by an angle of zero to fifteen degrees while standing may provide the user with a normal or typical use of the grating device 100, such as vertical grating, similar to a box grater.

As previously discussed in connection with FIG. 3, the grating device 100 may include features configured to attach the grater 104 to the hollow handle 102. For example, the grater 104 may include one of a protrusion or recess, and hollow handle 102 may include a complementary interfacing protrusion or recess configured to mate with the protrusion or recess of grater 104 such that mechanical interference occurs between the complementary interfacing features of grater 104 and hollow handle 102.

Figure 8:
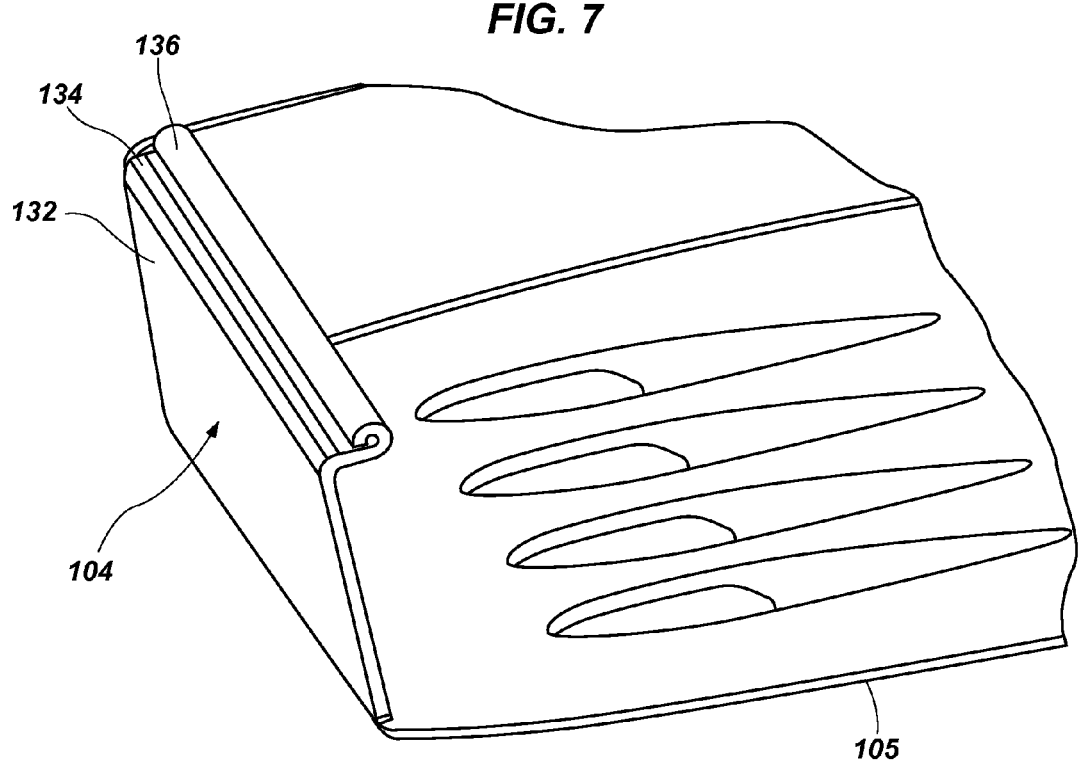
FIG. 8 is an enlarged partial perspective view of an embodiment of a hollow handle of the present disclosure.

Referring to FIG. 8, grater 104 may include end wall portions 132 positioned on grater 104 to correspond to the closed end wall portion 114 and the open end wall portion 116 (FIG. 3) of the hollow handle 102 (FIG. 8 shows only one end wall portion 132). Grater end wall portions 132 may extend away from the grating surface 105, and may extend in a direction substantially normal to the grating surface 105. A distal end of the grater end wall portion 132 may include an extension 134 (i.e., protrusion) extending from the grater end wall portion 132. Extension 134 may extend in a direction substantially parallel to the grating surface 105. An enlarged portion 136 may form a terminal end of the extension 134. A longitudinal dimension of the grater end wall portions 132 and extensions 134 may be substantially perpendicular to the grating direction (i.e., grater end wall portions 132 and extensions 134 may have a longitudinal dimension in directions extending into and out from the plane of FIG. 3).

Figure 9:
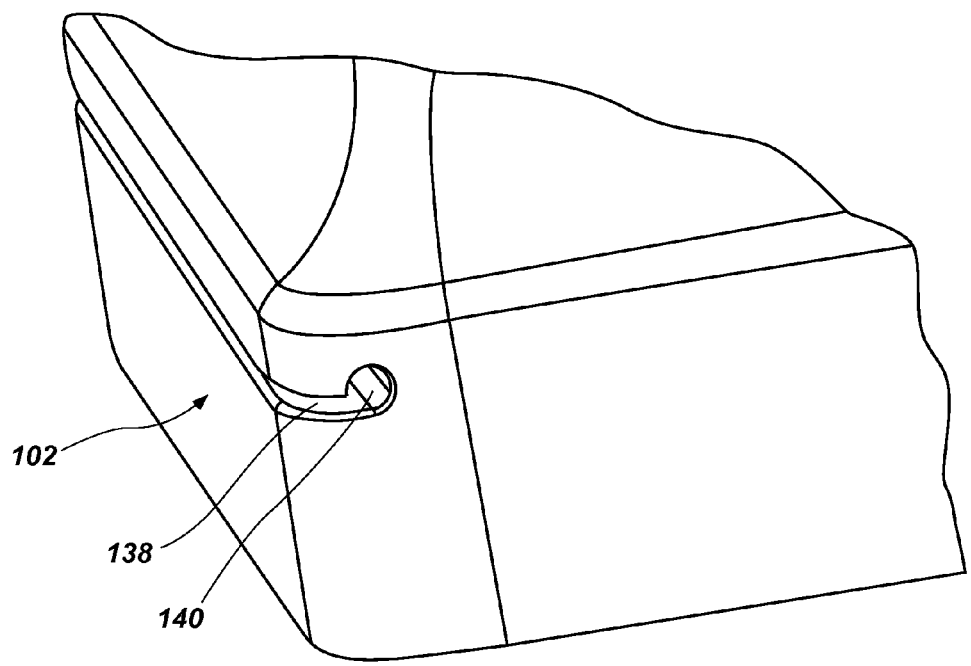
FIG. 9 is an enlarged partial plan view of a side of another embodiment of a grating device of the present disclosure.

Referring to FIG. 9, hollow handle 102 may include recesses 138 configured to mate with the extensions 134 of the grater 104 (FIG. 8). Recesses 138 may include enlarged cavities 140 corresponding to the enlarged portions 136 of the extensions 134. A longitudinal dimension of the recesses 138 may extend perpendicular to the grating direction (i.e., recesses 138 may extend in directions extending into and out from the plane of FIG. 3).

Figure 10:
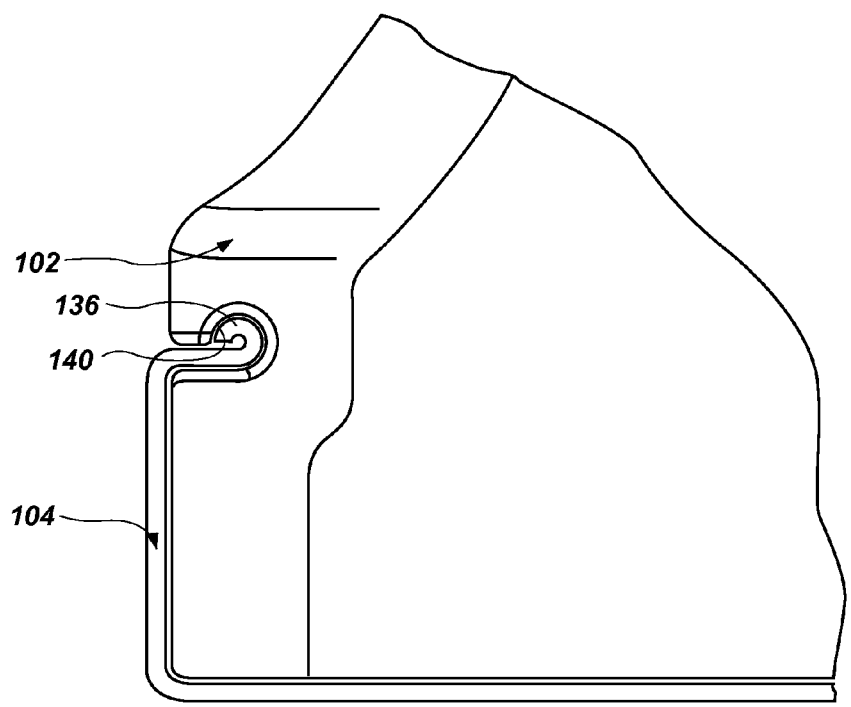
FIG. 10 is an enlarged cross-sectional view of a side of another embodiment of a grating device of the present disclosure.

Hollow handle 102 can be attached to grater 104 by inserting the extensions 134 of grater 104 into the recesses 138 of the hollow handle 102 and sliding the grater 104 and the hollow handle 102 together in a direction perpendicular to the grating direction of the grating device 100 and parallel to the grating surface 105, as described in connection with FIG. 3. FIG. 10 shows the grater 104 attached to hollow handle 102 in such manner. Mechanical interference between the enlarged portions 136 and the enlarged cavities 140 prevents protrusions 134 (FIG. 8) from moving laterally (i.e., the right-to-left direction from the perspective of FIG. 10) relative to recesses 138 (FIG. 9) and may prevent accidental removal of the grater 104 from the hollow handle 102 during use.

The embodiments of the disclosure described above do not limit the scope of the invention, since these embodiments are merely examples of embodiments of the invention, which is defined by the scope of the appended claims and their legal equivalents. Any equivalent embodiments are encompassed within the scope of this invention. Indeed, various modifications of the disclosed embodiments, such as alternate useful combinations of the described elements of the embodiments, will be readily apparent to those skilled in the art from the description. Such modifications also fall within the scope of the appended claims.

What is claimed is:

1. A grating device, comprising:
    a hollow handle having an interior cavity, the hollow handle comprising:
        a top wall portion having a major outer surface configured to abut against a palm of a hand of a person gripping the grating device;
        a pair of elongated longitudinal sidewall portions;
        a closed end wall portion extending between first longitudinal ends of the pair of longitudinal sidewall portions; and
        an open end wall portion extending between second longitudinal ends of the pair of longitudinal sidewall portions on an opposing side of the hollow handle from the closed end wall portion, the open end wall portion including at least one surface extending through the hollow handle defining a passageway between the interior cavity of the hollow handle and an exterior of the hollow handle; and
    a grater removably attachable to the hollow handle, wherein the grater is at least substantially planar and is disposed proximate the major outer surface of the top wall portion of the hollow handle and oriented generally parallel thereto.

2. The grating device of claim 1, wherein a maximum distance between the major outer surface of the top wall portion of the hollow handle and the grater is within a range extending from about one half of an inch to about four inches.

3. The grating device of claim 2, wherein the maximum distance between the major outer surface of the top wall portion of the hollow handle and the grater is within a range extending from about two inches to about four inches.

4. The grating device of claim 1, wherein the grater is attachable to the hollow handle in a first configuration and a second configuration, a grating direction of the device extending from the closed end wall portion to the open end wall portion of the hollow handle when the grater is attached to the hollow handle in the first configuration, the grating direction of the device extending from the open end wall portion to the closed end wall portion of the hollow handle when the grater is attached to the hollow handle in the second configuration.

5. The grating device of claim 1, wherein the grater comprises:
    a grater blade;
    a plurality of apertures extending through the grater blade; and
    a plurality of protrusions for removing material from a body of material to be grated as the body of material moves across the grater, each of the plurality of protrusions located proximate one of the plurality of apertures and configured to guide pieces of the material removed from the body of material through the plurality of apertures extending through the grater blade as the body of material is grated using the grating device.

6. The grating device of claim 1, wherein the hollow handle of the grating device includes a recess extending into each of the closed end wall portion and the elongated longitudinal sidewall portions of the hollow handle, the recess defining a rim extending around the hollow handle along a peripheral edge of the major outer surface of the top wall portion of the hollow handle, the rim and the recess located and configured to facilitate grasping of the hollow handle by a person gripping the grating device.

7. The grating device of claim 1, further comprising at least one connection feature located and configured to attach the grater to the hollow handle.

8. The grating device of claim 7, wherein the at least one connection feature comprises a mechanism actuated by a person using the grating device to release the grater from attachment to the hollow handle and to enable the person using the grating device to remove the grater from the hollow handle.

9. A grating device, comprising:
    a hollow handle having an interior cavity, the hollow handle comprising:
        a top wall portion having a major outer surface configured to abut against a palm of a hand of a person gripping the grating device;
        a pair of elongated longitudinal sidewall portions;
        a closed end wall portion extending between first longitudinal ends of the pair of longitudinal sidewall portions; and
        an open end wall portion extending between second longitudinal ends of the pair of longitudinal sidewall portions on an opposing side of the hollow handle from the closed end wall portion, the open end wall portion including at least one surface extending through the hollow handle defining a passageway between the interior cavity of the hollow handle and an exterior of the hollow handle; and
    a grater removably attachable to the hollow handle in a first configuration and a second configuration, a grating direction of the device extending from the closed end wall portion to the open end wall portion of the hollow handle when the grater is attached to the hollow handle in the first configuration, the grating direction of the device extending from the open end wall portion to the closed end wall portion of the hollow handle when the grater is attached to the hollow handle in the second configuration.

10. The grating device of claim 9, wherein a maximum distance between the major outer surface of the top wall portion of the hollow handle and the grater is within a range extending from about one half of an inch to about four inches.

11. The grating device of claim 10, wherein the maximum distance between the major outer surface of the top wall portion of the hollow handle and the grater is within a range extending from about two inches to about four and one-half inches.

12. The grating device of claim 9, further comprising at least one connection feature located and configured to attach the grater to the hollow handle.

13. The grating device of claim 12, wherein the at least one connection feature comprises a mechanism actuated by a person using the grating device to release the grater from attachment to the hollow handle and to enable the person using the grating device to remove the grater from the hollow handle.

14. The grating device of claim 13, wherein the grater and the hollow handle are configured such that the grater is removed from the hollow handle by providing relative movement between the grater and the hollow handle in a direction perpendicular to a plane of a grating surface of the grater.

15. The grating device of claim 9, wherein the hollow handle of the grating device includes a recess extending into each of the closed end wall portion and the elongated longitudinal sidewall portions of the hollow handle, the recess defining a rim extending around the hollow handle along a peripheral edge of the major outer surface of the top wall portion of the hollow handle, the rim and the recess located and configured to facilitate grasping of the hollow handle by a person gripping the grating device.

16. The grating device of claim 9, wherein the grater comprises:
a grater blade;
a plurality of apertures extending through the grater blade; and
a plurality of protrusions for removing material from a body of material to be grated as the body of material moves across the grater, each of the plurality of protrusions located proximate one of the plurality of apertures and configured to guide pieces of the material removed from the body of material through the plurality of apertures extending through the grater blade as the body of material is grated using the grating device.

17. A method of grating material using a grating device, comprising:
attaching a grater to a hollow handle in a first configuration to form the grating device, the hollow handle having an interior cavity and including a top wall portion having a major outer surface configured to abut against a palm of a hand of a person gripping the grating device, a pair of elongated longitudinal sidewall portions, a closed end wall portion extending between first longitudinal ends of the pair of longitudinal sidewall portions, and an open end wall portion extending between second longitudinal ends of the pair of longitudinal sidewall portions on an opposing side of the hollow handle from the closed end wall portion, the open end wall portion including at least one surface extending through the hollow handle defining a passageway between the interior cavity of the hollow handle and an exterior of the hollow handle;
grating a body of material using the grating device by moving the body of material across a grating surface of the grater in a first grating direction extending from the closed end wall portion to the open end wall portion of the hollow handle and allowing grated material to fall out from the interior of the hollow handle through the passageway while grating the body of material;
removing the grater from the hollow handle and reattaching the grater to the hollow handle in a second configuration; and
grating a body of material using the grating device by moving the body of material across the grating surface of the grater in a second grating direction extending from the open end wall portion to the closed end wall portion of the hollow handle and collecting grated material within the interior cavity of the hollow handle while grating the body of material.

18. The method of claim 17, wherein removing the grater from the hollow handle comprises moving the grater relative to the hollow handle in a direction perpendicular to a plane of the grating surface of the grater.

19. The method of claim 18, wherein removing the grater from the hollow handle comprises actuating a mechanism to release the grater from attachment to the hollow handle and to enable the grater to be moved relative to the hollow handle in the direction perpendicular to the plane of the grating surface of the grater.

20. The method of claim 17, wherein the grating device comprises a manual grating device, and wherein grating the body of material using the grating device further comprises holding the hollow handle of the grating device using a first hand of a person using the grating device, holding the body of material using a second hand of the person using the grating device, and manually moving the body of material across a grating surface of the grater in a first grating direction.

* * * * *